United States Patent [19]

Angstadt

[11] Patent Number: 4,769,161

[45] Date of Patent: Sep. 6, 1988

[54] SILICATE-CONTAINING OIL RECOVERY COMPOSITIONS

[75] Inventor: Howard P. Angstadt, Media, Pa.

[73] Assignee: Sun Refining and Marketing Company, Philadelphia, Pa.

[21] Appl. No.: 830,607

[22] Filed: Feb. 18, 1986

Related U.S. Application Data

[63] Continuation-in-part of Ser. No. 681,735, Dec. 14, 1984, abandoned.

[51] Int. Cl.[4] .................. E21B 43/22; E21B 43/24
[52] U.S. Cl. .................. 252/8.554; 166/272; 252/8.551
[58] Field of Search ............. 252/8.55 R, 8.55 D, 252/8.551, 8.554; 166/272

[56] References Cited

U.S. PATENT DOCUMENTS

| | | | |
|---|---|---|---|
| 2,920,041 | 1/1960 | Meadors | 252/8.55 |
| 3,348,611 | 10/1967 | Reisberg . | |
| 3,357,487 | 12/1967 | Gilchrist et al. | 166/245 |
| 3,501,409 | 3/1970 | Matson et al. | 252/137 |
| 3,805,893 | 4/1974 | Sarem | 166/270 |
| 3,871,452 | 3/1975 | Sarem | 166/270 |
| 3,871,453 | 3/1975 | Sarem | 166/270 |
| 3,874,454 | 4/1975 | Clark et al. | 252/8.55 X |
| 3,878,894 | 4/1975 | Clark et al. | 252/8.55 X |
| 3,885,626 | 5/1975 | Gale et al. | 166/273 |
| 3,920,074 | 11/1975 | Sarem | 166/274 |
| 3,933,201 | 1/1976 | Kerfoot et al. | 252/8.55 X |
| 3,994,342 | 11/1976 | Healy et al. | 166/273 |
| 3,994,345 | 11/1976 | Needham | 166/303 |
| 4,011,908 | 3/1977 | Holm | 166/273 |
| 4,037,659 | 7/1977 | Holm | 166/273 |
| 4,141,416 | 2/1979 | Holm | 166/270 |
| 4,187,185 | 2/1980 | Park et al. | 252/8.55 |
| 4,203,853 | 5/1980 | Allen | 252/8.55 |
| 4,295,980 | 10/1981 | Motz | 252/8.55 |
| 4,296,812 | 10/1981 | Kalfoglou | 166/274 |
| 4,458,759 | 7/1984 | Isaacs et al. | 166/272 |
| 4,556,107 | 12/1985 | Duerksen et al. | 166/273 X |

FOREIGN PATENT DOCUMENTS

1169759 6/1984 Canada .

Primary Examiner—Herbert B. Guynn
Attorney, Agent, or Firm—J. Edward Hess; Donald R. Johnson

[57] ABSTRACT

There is provided herein a process and composition for the enhanced recovery of oil from subterranean formations comprising injecting in combination with steam a composition comprising (a) an anionic surfactant (b) a hydrotrope, and (c) an alkali metal silicate.

In a further embodiment, the anionic surfactant and alkali metal silicate alone may be used in a steam recovery process as an effective oil recovery method.

4 Claims, No Drawings

SILICATE-CONTAINING OIL RECOVERY COMPOSITIONS

CROSS-REFERENCE TO RELATED CASES

This application is a continuation-in-part of Ser. No. 681,735, filed Dec. 14, 1984, now abandoned, in the name of Howard P. Angstadt.

BACKGROUND OF THE INVENTION

1. Field of the Invention

This invention relates to novel silicate-containing oil recovery surfactant compositions and methods of using the same in steam recovery systems to enhance the recovery oil from subterranean formations. More particularly, these compositions comprise certain anionic surfactants, in combination with hydrotropes and alkali metal silicates, and methods comprising injecting these compositions with steam into oil-bearing formations to greatly increase heavy oil recovery as compared with the use of surfactant-hydrotrope compositions alone.

This invention also relates to the method of recovering oil with steam wherein a combination of said surfactants and said silicates, without the hydrotrope, are employed to enhance the oil recovery.

2. Description of the Prior Art

The use of secondary and tertiary oil recovery techniques, with or without the addition of various reagents such as surfactants, water thickeners and the like to recover crude oil left behind in formations after the "primary" oil has been withdrawn is well established in the art. These displacement methods have been improved by the addition of surfactant compositions in both secondary and tertiary processes, for example where a formation has already been waterflooded at least once.

Representative of these prior art compositions and methods are those taught in U.S. Pat. Nos. 3,348,611 to Reisburg; 3,885,626 to Gale et al; 3,901,317 to Plummer et al; 3,994,342 to Healy et al; and 4,295,980 to Motz, all of which teach aqueous flooding techniques with at least one surfactant, and in some cases, with viscosity modifiers, co-surfactants or the like. In a unrelated field, U.S. Pat. No. 3,501,409 teaches a liquid washing detergent composition comprising said detergent in combination with a hydrotrope. Similarly, U.S. Pat. No. 4,165,294 teaches a commercial photoresist stripping solution comprising an alkylaruyl sulfonic acid and a hydrotope aromatic sulfonic acid. This composition, used to remove organic coatings from inorganic substrates, is further characterized in requiring the presence of a solvent and also requiring that the composition must be phenol-free and halogen-free. Finally, U.S. Pat. No. 3,354,091 discloses a heavy-duty liquid detergent consisting essentially of a 5-component composition requiring the presence of an alkali metal anionic surfactant, a polyphosphate salt, a hydrotrope, carboxymethylcellulose, and hydrogenated castor oil. Optionally, small amounts of sodium silicate may, for undisclosed reasons, be added as long as it does not adversely affect the desired properties of the composition.

It is also known from U.S. Pat. Nos. 2,920,041; 3,805,893; 3,871,452; 3,871,453; 3,920,074; and 4,141,416 to employ alkali metal silicates as additives in secondary and tertiary oil recovery methods which use aqueous flooding techniques. Further, it is known more recently to combine these and other silicates with surfactants in the form of micellar solution of high or low molecular weight surfactants such as alkyl aryl sulfonates, or mixtures thereof, as shown in U.S. Pat. Nos. 4,011,908 and 4,037,659. However, in the case of these latter two patents, it will be noted that the mechanism whereby micellar solutions operate in aqueous systems in significantly different from those of steam recovery systems of the present invention, as described below.

In addition to the aforedescribed aqueous flooding techniques, the art has also employed steam for tertiary oil recovery, utilizing the effect of heat to obtain heavy oil from the formations in which it is found. See, for example, U.S. Pat. Nos. 3,357,487 and 3,994,345. However, the mechanism and effects of surfactants and modifiers under these high temperatures and diverse formation conditions remain unclear, and thus make it impossible to predict from a knowledge of the effects of aqueous surfactant systems which surfactants, if any, can advantageously be employed in these steam recovery conditions. This is even more true in the choice of any modifiers which might enhance the effectiveness of the surfactant.

It is, therefore, an object of this invention to provide a novel silicate-containing surfactant composition useful for enhancing steam recovery processes for tertiary recovery of heavy oil from subterranean formations.

It is a further object of this invention to provide an improved steam recovery process for enhanced oil recovery, utilizing the novel compositions provided herein.

Further objects and advantages of the compositions and methods of the present invention will become apparent in the course of the following detailed description thereof.

SUMMARY OF THE INVENTION

In accordance with one aspect of the present invention, there is provided herein a novel silicate-containing surfactant composition useful in steam recovery processes for the enhanced recovery of crude oil from subterranean reservoirs, said composition comprising (1) an anionic surfactant; (2) an alkali metal silicate and (3) a hydrotrope, wherein the anionic surfactant is selected from the group consisting of long-chain alkyl aryl sulfonates, petroleum sulfonates, and olefin sulfonates, including derivatives of said olefin sulfonates such as ether sulfates, ethoxylated sulfonates and propoxylated sulfonates. The hydrotropes, as described in further detail hereinbelow, are also sulfonated compounds, but they differ from the surfactants defined below in having considerably lower molecular weight, being extremely water soluble, having very short side chains, and performing poorly as surfactants.

In a further embodiment of this invention there is also provided a method of recovering oil in steam recovery processes wherein there is employed a composition comprising (1) an anionic surfactant and (2) and alkali metal silicate alone.

As will be evident from the examples and following description, the novel compositions of this invention comprising said anionic surfactants, silicates and a hydrotrope, when employed in a steam recovery process, or the method employing just the surfactant and silicates in said stream process, exhibit unexpected benefits over what would be expected from the combined effects of steam alone, or steam and a surfactant.

As further discussed below, since a hydrotrope by definition is a compound which increases the solubility of a surfactant in water, the enhanced effect disclosed herein is particularly surprising because it would normally be supposed that the hydrotrope would increase the solubility of the surfactant in the aqueous portion of the steam, and decrease its solubility in the oil phase, thus rendering it less effective in oil recovery.

Moreover, apart from the mechanism of the hydrotrope, steam recovery systems themselves differ from water recovery systems in many ways. Thus, for example, steam is present in a gas phase, which itself provides different oil recovery mechanisms than does water. Also, since it is in a gas phase, the steam has considerably faster flow rates, allowing physical effects such as aspiration to occur. Further, condensation of the steam allows for much greater and more efficient heat transfer to the formation and the oil, so that the whole system can be heated hotter and faster than with water. Since the steam is hotter and less viscous than water, it can reach parts of the reservoir which are inaccessible to water. Also steam can effect distillation of lighter fractions of crude oil, producing unpredictable effects. Finally, steam can move heavy oils, which have different compositions from light oils moved by water, also with different effects. Thus, it will be seen that as between steam and water recovery systems, significant differences exist, the results of which are unpredictable from one system to the other.

DESCRIPTION OF THE PREFERRED EMBODIMENTS

Amongst the anionic surfactants useful in the composition and processes of this invention, one preferred embodiment comprises an alkyl aryl sulfonate having at least one long chain alkyl group, containing from about 12 to 30 carbon atoms, and optionally a short chain alkyl group containing from about 1 to 4 carbon atoms, i.e. a dialkyl aryl sulfonate. Thus, examples of the aryl nucleus to be alkylated with a long chain alkyl group include not only benzene but such lower alkyl-substituted aryl compounds as toluene or ethyl-benzene, or mixtures thereof. Generally, these alkyl compounds are preferred because of their high heat stability in a steam environment, and their resistance to chemical degradation by the caustic silicate solution.

By the term "long chain alkyl" is meant that at least one alkyl moiety of the alkyl aromatic sulfonate, which alkyl moiety may be branched or straight-chain, should desirably contain from about 12 to 30 carbon atoms, and most preferably an average of about 14 to 20 carbon atoms. The term "average" is meant to signify that the alkyl moiety may be derived from mixtures of hydrocarbons having a weighted average of from about 14 to 20 carbon atoms, even though somewhat shorter or longer chain lengths may be present in the mixture. Thus, in one preferred embodiment of the invention, the alkyl moiety may be derived from a mixed $C_{14-20}$ α-olefin source in which the molecular weight distribution is such that the resultant alkyl side chain has an average of about 16 carbon atoms, even though lesser amounts of somewhat shorter or longer chain lengths may be present in the alkylated product.

One preferred alkylate, having an average number of about 16.2 atoms in the side chain, may be derived from a wax-cracked $C_{14-18}$ α-olefin having the following weight distribution:

| Carbon Atoms in Side Chain | Weight Distribution (%) |
| --- | --- |
| $C_{14}$ | 2 |
| $C_{15}$ | 30 |
| $C_{16}$ | 30 |
| $C_{16}$ | 30 |
| $C_{17}$ | 28 |
| $C_{18}$ | 10 |

Alternatively, the alkylate may be prepared from a $C_{14-18}$ mixture derived from the polymerization of ethylene in a known manner, wherein the average alkyl group contains about 16.0 carbon atoms, and wherein the mixture is further characterized by alkyl groups having even-numbered carbon atoms only. A typical weight distribution of such a mixture is as follows:

| Carbon Atoms in Side Chain | Weight Distribution (%) |
| --- | --- |
| $C_{14}$ | 25 |
| $C_{16}$ | 50 |
| $C_{18}$ | 25 |

Alternatively, the long chain alkyl group may be derived from the oligomerization of propylene by known processes, as for example using phosphoric acid as the catalyst, or the like, wherein the side-chain may be either a single carbon number species which is a multiple of $C_3$, i.e. $C_{12}$, $C_{15}$, $C_{18}$, or $C_{21}$, or a blend of these branched oligomers, such that the average molecular weight of the side chain is in the $C_{15-18}$ range.

In place of alkyl aryl sulfonates there may be employed as the anionic surfactant in the compositions of this invention petroleum sulfonates. The petroleum sulfonates encompass a broad range of compounds which are well known in the art, and which are generally obtained by the sulfonation of naturally occurring petroleum streams derived from crude oil. Typical of this broad range are those petroleum sulfonates described in U.S. Pat. Nos. 3,302,713; 3,508,612; 3,648,772; and 3,901,317 all of which are incorporated herein by reference.

Thus, the term "natural petroleum sulfonates" is a commercial designation of petroleum sulfonates which are obtained by a treatment of petroleum fractions, particularly solvent-treated aromatic fractions, with, for example, sulfuric acid, fuming sulfuric acid, or sulfur trioxide. Upon sulfonation two types of general products are thereby formed which are known in the art as mohogany acid sulfonates and green acid sulfonates, respectively, based on their color and solubility in oil or water.

A third type of anionic surfactant which may be used in the compositions disclosed herein are, as mentioned above, α-olefin sulfonates which are generally commercially available materials, as for example those obtained from olefins made by the "SHOP" process available from Shell Oil Co. Typically these olefins may have the following structures: R—CH=CH—$R_1$, R—CH=$CH_2$, or

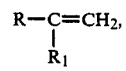

wherein R and $R_1$ may be hydrogen, or alkyl groups having from 8–28 carbon atoms, and may be the same or different. Preferred amongst these are those alkyl groups having from about 10 to 16 carbon atoms. While the methods for preparing these compounds are generally well known, the olefin sulfonates may best be described as the sulfonation products of wax-cracked hydrocarbons having from about 12 to 30 carbon atoms, or alternatively derived from ethylene oligomers, e.g., those obtained by Ziegler-type polymerizations, and having from about 12 to 30 carbon atoms. Also contemplated within the scope of the invention are known derivatives of said olefin sulfonates such as ether sulfates, ethoxylated sulfonates; or propoxylated sulfonates. In general, these compounds may be prepared by well-known procedures.

The preparation of the anionic surfactants, i.e., the alkylation and sulfonation of the aromatic moiety, or the preparation of the olefin or petroleum sulfonates, which are conventional techniques well known in the art, need not be described further herein in detail. For example, the alkylated hydrocarbons may be sulfonated in the usual way, using $SO_3$ in a falling film reactor, or with oleum, or the like. It is preferred, though not essential, that the sulfonates be employed in the form of their alkali metal salts.

Another component of the enhanced oil recovery composition is, as afore-described, an alkali metal silicate. These silicates are available in a wide range of compositions which are generally referred to and defined by the ratio of silica to alkali metal oxide i.e., by the weight ratio of $SiO_2/M_2O$, where M is an alkali metal, including ammonium. This ratio is not a fixed quantity and may vary greatly depending upon the quantities of metal oxide and silica employed. Thus, a wide range of silicate compositions may be formed and used in the practice of this invention. However, it is generally preferred to use those silicates which have relatively high proportion of silica.

Accordingly, it is desirable to employ those silicates having a weight ratio of $SiO_2/M_2O$ of about 0.5 to 4.0, preferably about 1.5 to 3.3, wherein M is an alkali metal, i.e. sodium, potassium, lithium, or ammonium. Examples of these silicates include alkali metal orthosilicates, alkali metal metasilicates, alkali metasilicate pentahydrates, and alkali metal sesquisilicates. Particularly useful in the practice of the invention are silicates such as sodium and potassium orthosilicate, sodium and potassium metasilicate, sodium and potassium metasilicate pentahydrate, and sodium and potassium sesquisilicate.

The alkali metal silicates used in the practice of this invention are available in solid form, and the respective alkali metal silicate solutions can be prepared by dissolving an appropriate quantity of the alkali silicate in water. However, in many cases it is more convenient and less costly to prepare the alkali metal silicate solution by adding caustic to an aqueous solution of an alkali metal silicate having a $SiO_2/M_2O$ weight ratio of more than 1. Alternatively, these silicates may be obtained commercially in pre-prepared ratios of $SiO_2/M_2O$ of, for example, 1.6; 2.4; 3.2 and the like, such as those made available by PQ Corp. under the trademark ACOR (E-Series).

A hydrotrope may be used as an additional component of the novel composition claimed herein, in combination with the anionic surfactants and alkali metal silicates, i.e., those compounds characterized in the art by their ability to increase the solubility of surfactants in aqueous systems. See, for example, the description in "Synthetic Detergents", Davidsohn et al, 6th Ed., Wiley and Sons, pages 79. 80. Included amongst these compounds are both aryl and non-aryl compounds. The aryl compounds are generally aryl sulfonates or short-chain alkyl aryl sulfonates in the form of their alkali metal salts, in which there may be present from 1 to 3 alkyl groups, each containing from 1 to about 3 carbon atoms, in which the aryl component may be benzene, or such alkyl-substituted aryl compounds as toluene, xylene, or cumene, or naphthalene. Included amongst these aryl hydrotropes are such preferred compounds as sodium xylene sulfonate, sodium toluene sulfonate, sodium benzene sulfonate, and the like. Non-aryl hydrotropes which may likewise be satisfactorily employed include such compounds as sodium isethionate, butane sulfonate, hexane sulfonate, and the like, i.e. sulfonates whose alkyl moiety contains from about 1 to 8 carbon atoms.

The mechanism by which these hydrotropes operate to enhance steamdriven surfactant systems in an essentially non-aqueous liquid oil environment is not known. As stated above, since hydrotropes increase the solubility of surfactants in water, it should render them less effective in oil recovery for the reasons stated. However, as will be shown in the examples below, when a hydrotrope is added to the surfactant-silicate system claimed herein, a further increase in oil recovery results compared to systems without the hydrotrope, in some cases as much as 31 percent.

The weight ratio of the anionic surfactant to hydrotrope in the composition of this invention is desirably from about 1:0.05 to 0.5:2, and preferably about 1:0.1 to 1:1, athough this amount may be varied considerably, depending upon the properties of the oil field being treated, as well as the nature of the selected hydrotrope, and the nature of the resulting composition. The weight ratio of surfactant to alkali metal silicate, with or without the hydrotrope, should desirably be from about 1:0.05 to 0.5:2, preferably about 1:0.1 to 1:1, but again this ratio may be varied depending upon the properties of the reservoir, the characteristics of the crude oil, and the properties of the resulting surfactant formulation. For convenience, this mixture of components may desirably be dissolved in water in order to prepare an easily-handled solution to add to the steam to be injected into the underground formation. Thus, for example, one preparation representing a preferred composition ready to be added to steam comprises 35% by weight of hexadecyltoluene sulfonate; 6% sodium silicate; optionally 17% sodium xylene sulfonate; and the balance water. However, these percentages may be varied somewhat, depending upon the nature of the oil, the subterranean formation, etc.

In addition to the three major components of the composition there may be optionally be included minor amounts of materials such as known stabilizers, bacteriostats, anti-oxidants, and the like. These materials, alone or in combination, may be added in amounts of up to 10–15% by weight of the total composition to the extent that they do not adversely affect the properties of the compositions for the use for which they are intended.

As described above, the surfactant system of this invention is desirably injected into the subterranean formations admixed in steam, in which the steam recovery process may be carried out either as a cyclic process or a steam drive process, and the heavy crude oil recovered in a generally well-known manner. Thus, in a typical cyclic steam process oil is produced from the same well from which the steam was previously added, while in a typical steam drive process the oil production well is remote from the steam injection well. In practice, the process of this invention may be applied equally to steam drive processes among multiple wells or to a cyclic process involving an individual well.

The amount of the surfactant-silicate or surfactant-silicate-hydrotrope composition of this invention to be admixed with the steam may vary widely according to the characteristics of the formation, and is not critical, but desirably the weight of the surfactant portion of the composition in the steam should be in the range of from about 0.02 to 10 wt. %, and preferably about 0.5–5 wt. %, based on the weight of the water equivalent of the steam. This concentration, in turn, may be achieved by metering the composition into the steam from a more concentrated solution, as described above.

The compositions and methods of this invention will now be illustrated by reference to the following examples, which are presented by way of illustration only and not by way of limitation on the scope of the invention.

EXAMPLES

In the following examples the method used to evaluate the usefulness of the composition comprised packing a tube having a diameter of 2" and a length of 18" with oil-saturated 140-mesh Ottowa sand. The water-wet sand was coated with Midway Sunset crude oil to between 60–65% residual oil saturation. The top 15% of the tube was filled with clean sand to simulate a zone of high permeability frequently found in steamed reservoirs. The tube was insulated to reduce heat losses, and then either a 40–50% quality steam (i.e. that proportion of the water in vapor form), alone or a 40–50% quality steam in combination with various surfactant, hydrotope, and silicate systems diluted to concentrations of 1 weight percent surfactant based on the water equivalent of the steam, was passed through the sand pack at appropriate rates until no more oil was evident exiting from the apparatus. The amount of oil recovered was measured in one or both of two ways: (1) total liquid oil obtained from the pack; or (2) the oil remaining on the sand at the end of the experiment was determined, and the amount recovered calculated as the difference from the value determined to be on the sand at the start of the experiment. The percent of oil recovered, based on the amount of oil originally in place the pack, is summarized in Table I below.

In each of these examples ·9.3 cc (100% surfactant-active basis) of an alkyl toluene sulfonate whose alkyl moiety contained an average of 16 carbon atoms was admixed with the appropriate amounts of a sodium silicate having $SiO_2/Na_2O$ weight ratios of 1.6, 2.4, and 3.2 respectively, as indicated in the table, sufficient to provide the weight ratios of surfactant to silicate also shown in the table. This mixture was diluted to provide a final concentration of 1 wt.% of surfactant in the steam (based on the weight of its water equivalent). These silicates were obtained from PQ Corp. under the trademark ACOR (E-Series).

In Examples 10–16 the hydrotrope sodium xylene sulfonate was added to the above systems in amounts sufficient to provide a weight percent ratio of surfactant to hydrotrope of about 35:20 (i.e., a ratio of 1:0.57) and the same procedure followed. In addition, a series of runs was made with steam alone for purposes of comparison. The average percent recovery from these runs is reported in Example 17.

TABLE 1

| EXAMPLE | SURFACTANT[a] | HYDROTROPE[b] | SILICATE[c] ($SiO_2/Na_2O$) | WEIGHT RATIO (SURF./SIL.) | WEIGHT RATIO (SURF./HYDRO.) | RECOVERY[i] (% OOIP) |
|---|---|---|---|---|---|---|
| 1 | $C_{16}$ ATS | — | 1.6[d] | 1:0.2 | — | 60.8 |
| 2 | $C_{16}$ ATS | — | 1.6[d] | 1:0.5 | — | 74.5 |
| 3 | $C_{16}$ ATS | — | 1.6[d] | 1:1 | — | 79.6 |
| 4 | $C_{16}$ ATS | — | 2.4[e] | 1:0.2 | — | 72.5 |
| 5 | $C_{16}$ ATS | — | 2.4[e] | 1:0.5 | — | 74.8 |
| 6 | $C_{16}$ ATS | — | 2.4[e] | 1:1 | — | 73.5 |
| 7 | $C_{16}$ ATS | — | 3.2[f] | 1:0.2 | — | 69.0 |
| 8 | $C_{16}$ ATS | — | 3.2[f] | 1:0.5 | — | 75.0 |
| 9 | $C_{16}$ ATS | — | 3.2[f] | 1:1 | — | 79.4 |
| 10 | $C_{16}$ ATS | SXS | 1.6[d] | 1:0.2 | 1:0.57 | 69.9 |
| 11 | $C_{16}$ ATS | SXS | 1.6[d] | 1:0.5 | 1:0.57 | 87.9 |
| 12 | $C_{16}$ ATS | SXS | 1.6[d] | 1:1 | 1:0.57 | 84.2 |
| 13 | $C_{16}$ ATS | SXS | 2.4[e] | 1:0.2 | 1:0.57 | 83.4 |
| 14 | $C_{16}$ ATS | SXS | 2.4[e] | 1:0.5 | 1:0.57 | 84.4 |
| 15 | $C_{16}$ ATS | SXS | 2.4[e] | 1:1 | 1:0.57 | 87.0 |
| 16 | $C_{16}$ ATS | SXS | 3.2[f] | 1:0.2 | 1:0.57 | —[g] |
| 17[h] | — | — | — | — | — | 44.5 |

[a]surfactant = $C_{16}$ ATS = a $C_{16}$ (ave.) alkyl toluene sulfonate
[b]hydrotrope = SXS = sodium xylene sulfonate
[c]silicate = ACOR E-Series sodium silicate
[d]$SiO_2/Na_2O$ weight ratio of 1.6, obtained from PQ Corp. under the trademark ACOR E-16
[e]$SiO_2/Na_2O$ weight ratio of 2.4, obtained from PQ Corp. under the trademark ACOR E-24
[f]$SiO_2/Na_2O$ weight ratio of 3.2, obtained from PQ Corp. under the trademark ACOR E-32
[g]phase separation at all ratios - could not resolubilize
[h]steam alone - average recovery from 8 runs
[i]OOIP = original oil in place In comparison to the average 44.5% OOIP normally experienced when only steam is employed in these experiments, the additional benefit of using the disclosed compositions is at minimum an additional 16% of the OOIP, or one-third more than obtained with only steam, and can range to as much as an additional 43.4% of the OOIP, or almost 100% increase over steam alone in recoverable oil.

EXAMPLE 18

In accordance with the procedures of Example 11, but substituting a $C_{16}$ (ave.) alkyl benzene sulfonate for the alkyl toluene sulfonate, and sodium cumene sulfonate for the sodium xylene sulfonate, comparable amounts of oil are recovered.

EXAMPLE 19

In accordance with the procedures of Example 16, but substituting an α-olefin sulfonate having an average of 15 carbon atoms for the alkyl toluene sulfonate, and sodium benzene sulfonate for sodium xylene sulfonate, comparable amounts of oil are recovered.

EXAMPLE 20

In accordance with the procedures of Example 14, but substituting a petroleum sulfonate having an average of 20 carbon atoms for the alkyl toluene sulfonate, and butane sulfonate for sodium xylene sulfonate, comparable amounts of oil are recovered.

What we claim is:

1. A composition for the enhanced recovery of oil from subterranean formations comprising:
   a. A $C_{14-20}$ alkyl toluene sulfonate, a $C_{14-20}$ alkyl ethylbenzene sulfonate, a $C_{8-30}$ alpha olefin sulfonate or a $C_{14-20}$ alkyl benzene sulfonate;
   b. an alkali metal silicate having an $SiO_2/M_2O$ weight ratio of from about 0.5 to 4.0, wherein M is an alkali metal;
   c. a hydrotrope selected from the group consisting of an alkali metal xylene sulfonate, an alkali metal toluene sulfonate, alkali metal benzene sulfonate, an alkali metal isethionate, an alkali metal butane sulfonate, an alkali metal hexane sulfonate and an alkali metal cumene sulfonate; and
   d. steam,
   wherein the weight ratio of component a. to component b. is from about 1:0.05 to 0.5:2, and the weight ratio of component a. to component c. is from about 1:0.05 to 0.5:2.

2. The composition according to claim 1 wherein said $SiO_2/M_2$ weight ratio is from about 1.5 to 3.3.

3. The composition according to claim 1 wherein the alkyl moiety of the alkyl toluene sulfonate, alkyl ethylbenzene sulfonate or alkyl benzene sulfonate contains an average of about 16 carbon atoms.

4. The composition according to claim 1 wherein the concentration of the surfactant is from about 0.02 to 10.0% by weight of the water equivalent of the steam.

* * * * *